(12) United States Patent
Abdallah et al.

(10) Patent No.: US 8,211,621 B2
(45) Date of Patent: Jul. 3, 2012

(54) ANTIREFLECTIVE COATING COMPOSITIONS

(75) Inventors: David Abdallah, Bernardsville, NJ (US); Francis Houlihan, Millington, NJ (US); Mark Neisser, Whitehouse Station, NJ (US)

(73) Assignee: AZ Electronic Materials USA Corp., Somerville, NJ (US)

( * ) Notice: Subject to any disclaimer, the term of this patent is extended or adjusted under 35 U.S.C. 154(b) by 0 days.

(21) Appl. No.: 12/797,949

(22) Filed: Jun. 10, 2010

(65) Prior Publication Data

US 2010/0248137 A1 Sep. 30, 2010

Related U.S. Application Data

(62) Division of application No. 11/613,410, filed on Dec. 20, 2006.

(51) Int. Cl.
*G03F 7/30* (2006.01)
*G03F 7/11* (2006.01)
*C08L 63/00* (2006.01)
*C08L 67/00* (2006.01)

(52) U.S. Cl. ............ 430/271.1; 430/325; 430/326; 430/313; 430/323; 525/418; 525/523; 525/50

(58) Field of Classification Search .......... None
See application file for complete search history.

(56) References Cited

U.S. PATENT DOCUMENTS

| 3,308,102 | A | | 5/1964 | Wilson |
| 3,278,490 | A | * | 10/1966 | Rosen et al. .......... 528/236 |
| 3,364,995 | A | | 1/1968 | Atkins et al. |
| 3,883,446 | A | | 5/1975 | McGuire |
| 3,915,704 | A | * | 10/1975 | Limburg et al. ............ 430/17 |
| 4,070,295 | A | | 1/1978 | Miller |
| 4,504,646 | A | * | 3/1985 | Nate et al. ................. 528/16 |
| 4,820,829 | A | * | 4/1989 | Steinmann ................. 556/87 |
| 4,897,336 | A | * | 1/1990 | Chien ....................... 430/197 |
| 5,562,653 | A | * | 10/1996 | Thompson ............. 604/890.1 |
| 6,214,521 | B1 | | 4/2001 | Telser et al. |
| 6,277,750 | B1 | * | 8/2001 | Pawlowski et al. ......... 438/689 |
| 6,916,592 | B2 | | 7/2005 | Harada et al. |
| 6,919,161 | B2 | | 7/2005 | Hatakeyama et al. |
| 7,537,879 | B2 | | 5/2009 | Houlihan et al. |
| 2005/0171277 | A1 | * | 8/2005 | Li et al. .................... 524/588 |
| 2008/0196626 | A1 | | 8/2008 | Wu et al. |

OTHER PUBLICATIONS

Form PCT/IB/326, Form PCT/IB/373, and Form PCT/ISA/237 date mailed Sep. 25, 2008 for PCT/IB2007/000621, which corresponds to U.S. Appl. No. 11/372,680.
Office Action date mailed Jul. 8, 2010 U.S. Appl. No. 12/263,511.
Office Action date mailed Nov. 24, 2010 U.S. Appl. No. 12/263,511.
Shinohara et al., AN 1966: 20319, Abstract from CAPLUS, ACS on STN, one page entered in STN Apr. 22, 2001.
Florjanczyk et al., Reactivity of vinyl monomers in the copolymerization and terpolymerization with sulfur dioxide, Macromol. Chem. vol. 188, pp. 2811—pp. 2820 (1987).
Notification of the First Office Action date mailed Apr. 25, 2011 from the Chinese Patent Office for Chinese Patent Application No. 200780047292.2, which corresponds to U.S. Appl. No. 12/613,410.
English Language Translation of Notification of the First Office Action date mailed Apr. 25, 2011 from the Chinese Patent Office for Chinese Patent Application No. 200780047292.2, which corresponds to U.S. Appl. No. 12/613,410.

* cited by examiner

*Primary Examiner* — Cynthia Hamilton
(74) *Attorney, Agent, or Firm* — Sangya Jain

(57) ABSTRACT

The present invention discloses novel bottom anti-reflective coating compositions where a coating from the composition has an etch rate that can be regulated by the etch plate temperature.

10 Claims, No Drawings

ANTIREFLECTIVE COATING COMPOSITIONS

CROSS-REFERENCE TO RELATED APPLICATION

This application is a divisional application of Ser. No. 11/613,410 filed Dec. 20, 2006, the contents of which are hereby incorporated herein by reference.

FIELD OF INVENTION

The present invention relates to novel antireflective coating compositions and their use in image processing by forming a thin layer of the novel antireflective coating composition between a reflective substrate and a photoresist coating. Such compositions are particularly useful in the fabrication of semiconductor devices by photolithographic techniques, especially those requiring exposure with deep ultraviolet radiation.

BACKGROUND

Photoresist compositions are used in microlithography processes for making miniaturized electronic components such as in the fabrication of computer chips and integrated circuits. Generally, in these processes, a thin coating of a film of a photoresist composition is first applied to a substrate material, such as silicon wafers used for making integrated circuits. The coated substrate is then baked to evaporate any solvent in the photoresist composition and to fix the coating onto the substrate. The baked and coated surface of the substrate is next subjected to an image-wise exposure to radiation.

This radiation exposure causes a chemical transformation in the exposed areas of the coated surface. Visible light, ultraviolet (UV) light, electron beam and X-ray radiant energy are radiation types commonly used today in microlithographic processes. After this image-wise exposure, the coated substrate is treated with a developer solution to dissolve and remove either the radiation-exposed or the unexposed areas of the photoresist.

There are two types of photoresist compositions, negative-working and positive-working. When positive-working photoresist compositions are exposed image-wise to radiation, the areas of the photoresist composition exposed to the radiation become soluble in a developer solution (e.g. a rearrangement reaction occurs) while the unexposed areas of the photoresist coating remain relatively insoluble to such a solution. Thus, treatment of an exposed positive-working photoresist with a developer causes removal of the exposed areas of the photoresist coating and the formation of a positive image in the coating, thereby uncovering a desired portion of the underlying substrate surface on which the photoresist composition was deposited. In a negative-working photoresist the developer removes the portions that are not exposed.

The trend towards the miniaturization of semiconductor devices has led both to the use of new photoresists that are sensitive to lower and lower wavelengths of radiation, and also to the use of sophisticated multilevel systems to overcome difficulties associated with such miniaturization.

High resolution, chemically amplified, deep ultraviolet (100-300 nm) positive and negative tone photoresists are available for patterning images with less than quarter micron geometries. There are two major deep ultraviolet (uv) exposure technologies that have provided significant advancement in miniaturization, and these are lasers that emit radiation at 248 nm and 193 nm. Examples of such photoresists are given in the following patents and incorporated herein by reference, U.S. Pat. Nos. 4,491,628, 5,350,660, EP 794458 and GB 2320718. Photoresists for 248 nm have typically been based on substituted polyhydroxystyrene and its copolymers. On the other hand, photoresists for 193 nm exposure require non-aromatic polymers, since aromatics are opaque at this wavelength. Generally, alicyclic hydrocarbons are incorporated into the polymer to replace the etch resistance lost by eliminating the aromatic functionality. Furthermore, at lower wavelengths the reflection from the substrate becomes increasingly detrimental to the lithographic performance of the photoresist. Therefore, at these wavelengths antireflective coatings become critical.

The use of highly absorbing antireflective coatings in photolithography is a simpler approach to diminish the problems that result from back reflection of light from highly reflective substrates. Two major disadvantages of back reflectivity are thin film interference effects and reflective notching. Thin film interference can cause swing effects that result in changes in critical line width dimensions caused by variations in the total light intensity in the resist film as the thickness of the resist changes and standing waves that result in wavy feature edges stemming from dose oscillating in the vertical direction. Reflective notching becomes severe as the photoresist is patterned over substrates containing topographical features, which scatter light through the photoresist film, leading to line width variations, and in the extreme case, forming regions with complete photoresist loss (for positive resists) or unexpected photoresist masking (for negative resists).

The use of bottom antireflective coatings provides the best solution for the elimination of reflectivity. The bottom antireflective coating is applied on the substrate and then a layer of photoresist is applied on top of the antireflective coating. The photoresist is exposed imagewise and developed. The antireflective coating in the exposed area of a positive photoresist is then typically etched and the photoresist pattern is thus transferred to the substrate.

A consequence of using an antireflective coating is its effect on etch rate selectivity as compared to the photoresist that is coated over the antireflective coating. In most single layer pattern transfer processes, an important and desired property of antireflective coatings is their high etch rates in plasmas. It is well known in the semiconductor industry that a antireflective coating that has a significantly higher etch rate than the photoresist will be better in successfully transfer the pattern after exposure and further processing steps. This, however, makes it difficult to formulate both antireflective coatings and photoresists since both materials are based on similar types of polymers. While one way to control the etch property of the antireflective coating is by the selection of the polymer dye used in the antireflective coating material, this can lead to formulation issues in conjunction with its use with photoresists. Thus, there is a need to develop an antireflective coating composition that has good etch rate and etch rate selectivity that is not dependent upon the polymers used in the antireflective coatings and photoresist.

Etch selectivity is a measure of etch rate removal of one material compared to another. Often, the resist and the antireflective coating are compositionally and structurally similar, which leads to a lack of selectivity between these two materials even if the condition under which the antireflective coating break-through steps are performed are changed, for example, altering plate bake temperature, enchant gases, voltage biases, pressures, and the like.

There are several approaches to creating etch selectivity differences between the resist and antireflective coating. For example, by making the antireflective coating compositionally and structurally different from the resist (by, for example, incorporating as much oxygen content into the antireflective coating resins), the obtained selectivity difference is more or less constant when changing etch process conditions as mentioned above.

It is well known in the semiconductor industry that an antireflective coating that has a significantly higher etch rate than the photoresist will be better in successfully transfer the pattern after exposure and further processing steps. There are also applications where a matched etch rate would be desirable (no selectivity) as in the case of gate trimming or in via filling where etch times can be reduced by selecting conditions amenable to higher etch rates during the via fill removal step. Thus, there is a need to develop an antireflective coating composition that has etch rate selectivity that can be tuned to facilitate both pattern transfer and CD trimming or in schemes where antireflective coatings are required to be have different selectivities at different steps in pattern transfer process.

The inventors have found that polymers that have a ceiling temperature (the temperature at which polymerization and monomer formation are at equilibrium) at or near the etch plate temperature in the etch chamber, the etch rate selectivity of the antireflective coating can be tuned, depending upon the requirements of the semiconductor engineer.

SUMMARY OF THE INVENTION

The present invention relates to a composition comprising a) a polymer having a ceiling temperature in the range from about 0° C. to about 70° C.; b) a crosslinker; and c) optionally, a cross-linking catalyst. In addition, the present invention relates to a coating layer from the above composition formed on a substrate where the layer has a rate of etch rate to etch plate temperature of at least 30 Å·min$^{-1}$/° C.

The polymer a) can be selected from (i) a polymer comprising repeating units

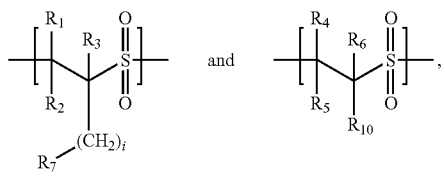

(ii) a polymer comprising repeating units

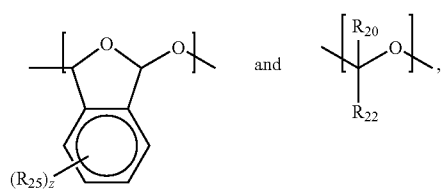

or (iii) a polymer comprising repeating units

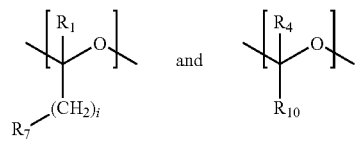

where $R_1$, $R_2$, $R_3$, $R_4$, $R_5$, $R_6$, and $R_{20}$ are each independently selected from hydrogen, halogen, and $C_{1-4}$ alkyl which is unsubstituted or substituted; $R_7$ is a chromophore which absorbs at any actinic wavelength; $R_{10}$ is —$(CH_2)_j$—$OR_8$ and $R_8$ is hydrogen, an acid labile group, a crosslinking site, or $R_5$ and $R_{10}$ together with the carbon atoms to which they are bound form a $C_{5-15}$ mono- or polycycloalkyl group which is unsubstituted or substituted; $R_{22}$ is selected from $C_{1-4}$ alkyl which is unsubstituted or substituted, alkoxycarbonyl which is unsubstituted or substituted, or a crosslinking site; $R_{25}$ is $C_{1-4}$ alkyl which is unsubstituted or substituted, $C_{1-4}$ alkoxy which is unsubstituted or substituted, halogen, cyano, and nitro; i is 0 or 1; j is 0, 1, or 2; and z is 1 to 4, for example.

A method of forming a photoresist relief image using the above composition and a coated substrate having a layer of the above composition are also provided. Additionally, when a coating layer is formed from the above composition on a substrate, the layer will have a rate of etch rate to etch plate temperature of at least 30 Å·min$^{-1}$/° C.

DETAILED DESCRIPTION OF THE INVENTION

The present invention relates to a composition comprising a) a polymer having a ceiling temperature in the range from about 0° C. to about 70° C.; b) a crosslinker; and c) optionally, a cross-linking catalyst. In addition, the present invention relates to a coating layer from the above composition formed on a substrate where the layer has a rate of etch rate to etch plate temperature of at least 30 Å·min$^{-1}$/° C.

The polymer a) can be selected from (i) a polymer comprising repeating units

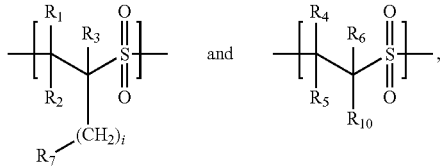

(ii) a polymer comprising repeating units

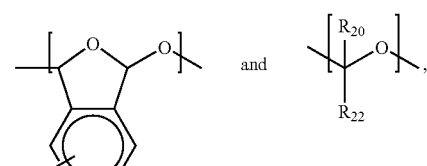

or (iii) a polymer comprising repeating units

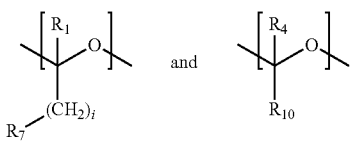

where $R_1$, $R_2$, $R_3$, $R_4$, $R_5$, $R_6$, and $R_{20}$ are each independently selected from hydrogen, halogen, and $C_{1-4}$ alkyl which is unsubstituted or substituted; $R_7$ is a chromophore which absorbs at any actinic wavelength; $R_{10}$ is —$(CH_2)_j$—$OR_8$ and $R_8$ is hydrogen, an acid labile group, a crosslinking site, or $R_5$ and $R_{10}$ together with the carbon atoms to which they are bound form a $C_{5-15}$ mono- or polycycloalkyl group which is unsubstituted or substituted; $R_{22}$ is selected from $C_{1-4}$ alkyl which is unsubstituted or substituted, alkoxycarbonyl which is unsubstituted or substituted, or a crosslinking site; $R_{25}$ is $C_{1-4}$ alkyl which is unsubstituted or substituted, $C_{1-4}$ alkoxy which is unsubstituted or substituted, halogen, cyano, and nitro; i is 0 or 1; j is 0, 1, or 2; and z is 1 to 4, for example.

A method of forming a photoresist relief image using the above composition and a coated substrate having a layer of the above composition are also provided. Additionally, when a coating layer is formed from the above composition on a substrate, the layer will have a rate of etch rate to etch plate temperature of at least 30 Å·min$^{-1}$/° C.

The composition wherein the polymer is selected from

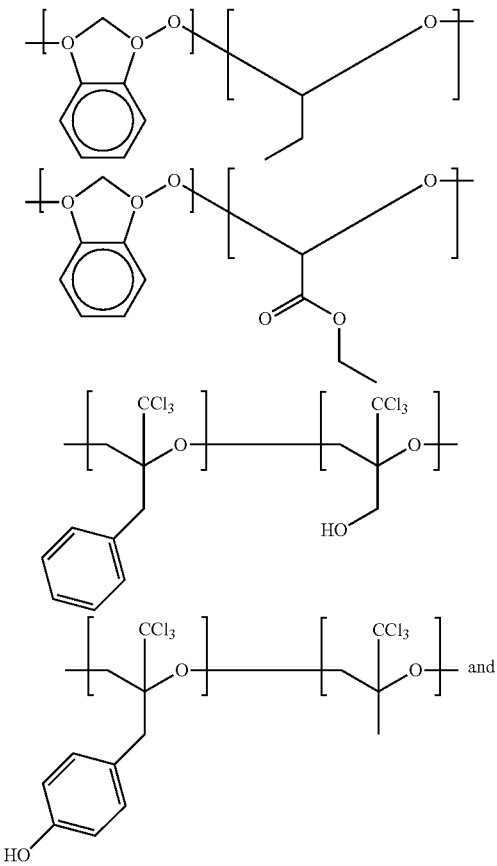

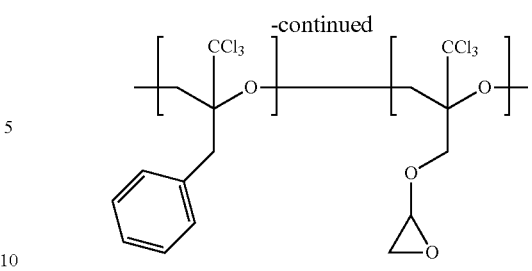

The chromophore which absorbs at any actinic wavelength, $R_7$, can be selected from unsubstituted or substituted aromatic moieties, and unsubstituted or substituted heteroaromatic moieties. Examples of chromophores include, but are not limited to, unsubstituted and substituted fluorene, unsubstituted and substituted vinylenephenylene, unsubstituted and substituted naphthalene, unsubstituted and substituted anthracene, unsubstituted and substituted phenanthracene, unsubstituted and substituted perylene, unsubstituted and substituted phenyl, unsubstituted and substituted benzyl, unsubstituted and substituted chalcone, unsubstituted and substituted phthalimides, unsubstituted and substituted thiophenes, unsubstituted and substituted pamoic acid, unsubstituted and substituted acridine, unsubstituted and substituted azo compounds, unsubstituted and substituted dibenzofuran, unsubstituted and substituted benzenes, unsubstituted and substituted chrysenes, unsubstituted and substituted pyrenes, unsubstituted and substituted fluoranthrenes, unsubstituted and substituted anthrones, unsubstituted and substituted benzophenones, unsubstituted and substituted thioxanthones, unsubstituted and substituted heterocyclic aromatic rings containing heteroatoms selected from oxygen, nitrogen, sulfur, and combinations thereof, as well as derivatives of any of the foregoing.

In addition, according to the present invention, crosslinking sites may be included in the polymer. Examples of such reactive groups include epoxides (e.g., propyl epoxy), hydroxyls (e.g., hydroxyethyl), sulfonic acids, sulfonic acid esters, silyl ethers, vinyl ethers, carboxylic acids, esters of carboxylic acids, anhydrides, alkyl halides, cyanates, isocyanates, and the like. The choice of such a group is based on the balance between its stability in the formulation and its reactivity upon thermal treatment.

As examples of the acid-labile group represented by $R_8$, the following can be considered, but is not to be considered limiting in any way: a tertiary alkyl group, acetal group, substituted methyl group, 1-substituted ethyl group, 1-substitution propyl group, 1-branched alkyl group (excluding tertiary alkyl groups), silyl group, germyl group, alkoxycarbonyl group, acyl group, cyclic acid-labile group, and the like can be given.

As examples of the tertiary alkyl group, a t-butyl group, 1,1-dimethylpropyl group, 1-methyl-1-ethylpropyl group, 1,1-dimethylbutyl group, 1-methyl-1-ethylbutyl group, 1,1-dimethylpentyl group, 1-methyl-1-ethylpentyl group, 1,1-dimethylhexyl group, 1,1-dimethylheptyl group, 1,1-dimethyloctyl group, and the like can be given.

As examples of the acetal group, a methoxymethoxy group, ethoxymethoxy group, n-propoxymethoxy group, i-propoxymethoxy group, n-butoxymethoxy group, t-butoxymethoxy group, n-pentyloxymethoxy group, n-hexyloxymethoxy group, cyclopentyloxymethoxy group, cyclohexyloxymethoxy group, 1-methoxyethoxy group, 1-ethoxyethoxy group, 1-n-propoxyethoxy group, 1-i-propoxyethoxy group, 1-n-butoxyethoxy group, 1-t-butoxyethoxy group, 1-n-pentyloxyethoxy group, 1-n-hexyloxyethoxy group, 1-cyclopentyloxyethoxy group, 1-cyclohexyloxyethoxy group, (cyclohexyl)(methoxy)methoxy group, (cyclohexyl)(ethoxy)methoxy group, (cyclohexyl)(n-propoxy)methoxy group, (cyclohexyl)(1-propoxy) methoxy group, (cyclohexyl)(cyclohexyloxy)methoxy group, and the like can be given.

As examples of the substituted methyl group, a methoxymethyl group, methylthiomethyl group, ethoxymethyl group, ethylthiomethyl group, methoxyethoxymethyl group, benzyloxymethyl group, benzylthiomethyl group, phenacyl group, bromophenacyl group, methoxyphenacyl group, methylthiophenacyl group, .alpha.-methylphenacyl group, cyclopropylmethyl group, benzyl group, diphenylmethyl group, triphenylmethyl group, bromobenzyl group, nitrobenzyl group, methoxybenzyl group, methylthiobenzyl group, ethoxybenzyl group, ethylthiobenzyl group, piperonyl group, methoxycarbonylmethyl group, ethoxycarbonylmethyl group, n-propoxycarbonylmethyl group, i-propoxycarbonylmethyl group, n-butoxycarbonylmethyl group, t-butoxycarbonylmethyl group, and the like can be given.

As examples of the 1-substituted methyl group, a 1-methoxyethyl group, 1-methylthioethyl group, 1,1-dimethoxyethyl group, 1-ethoxyethyl group, 1-ethylthioethyl group, 1,1-diethoxyethyl group, 1-phenoxyethyl group, 1-phenylthioethyl group, 1,1-diphenoxyethyl group, 1-benzyloxyethyl group, 1-benzylthioethyl group, 1-cyclopropylethyl group, 1-phenylethyl group, 1,1-diphenylethyl group, 1-methoxycarbonylethyl group, 1-ethoxycarbonylethyl group, 1-n-propoxycarbonylethyl group, 1-i-propoxycarbonylethyl group, 1-n-butoxycarbonylethyl group, 1-t-butoxycarbonylethyl group, and the like can be given.

As examples of the 1-substituted propyl group, a 1-methoxypropyl group, 1-ethoxypropyl group, and the like can be given.

As examples of the 1-branched alkyl group, i-propyl group, sec-butyl group, 1-methylbutyl group, and the like can be given.

As examples of the silyl group, a trimethylsilyl group, ethyldimethylsilyl group, methyldiethylsilyl group, triethylsilyl group, i-propyldimethylsilyl group, methyldi-i-propylsilyl group, tri-i-propylsilyl group, t-butyldimethylsilyl group, methyldi-t-butylsilyl group, tri-t-butylsilyl group, phenyldimethylsilyl group, methyldiphenylsilyl group, triphenylsilyl group, and the like can be given.

As examples of the germyl group, a trimethylgermyl group, ethyldimethylgermyl group, methyldiethylgermyl group, triethylgermyl group, i-propyldimethylgermyl group, methyldi-i-propylgermyl group, tri-i-propylgermyl group, t-butyldimethylgermyl group, methyldi-t-butylgermyl group, tri-t-butylgermyl group, phenyldimethylgermyl group, methyldiphenylgermyl group, triphenylgermyl group, and the like can be given.

As an example, alkoxycarbonyl means alkyl-O—C(=O)—, wherein alkyl is as previously described. Non-limiting examples include methoxycarbonyl [$CH_3O$—C(=O)—] and the ethoxycarbonyl [$CH_3CH_2O$—C(=O)—], benzyloxycarbonyl [$C_6H_5CH_2O$—C(=O)—] and the like.

As examples of the acyl group, an acetyl group, propionyl group, butyryl group, heptanoyl group, hexanoyl group, valeryl group, pivaloyl group, isovaleryl group, lauroyl group, myristoyl group, palmitoyl group, stearoyl group, oxalyl group, malonyl group, succinyl group, glutaryl group, adipoyl group, piperoyl group, suberoyl group, azelaoyl group, sebacoyl group, acryloyl group, propioloyl group, methacryloyl group, crotonoyl group, oleoyl group, maleoyl group, fumaroyl group, mesaconoyl group, campholoyl group, benzoyl group, phthaloyl group, isophthaloyl group, terephthaloyl group, naphthoyl group, toluoyl group, hydroatropoyl group, atropoyl group, cinnamoyl group, furoyl group, thenoyl group, nicotinoyl group, isonicotinoyl group, p-toluenesulfonyl group, mesyl group, and the like can be given.

As examples of the cyclic acid-labile group, a 3-oxocyclohexyl group, tetrahydropyranyl group, tetrahydrofuranyl group, tetrahydrothiopyranyl group, tetrahydrothiofuranyl group, 3-bromotetrahydropyranyl group, 4-methoxytetrahydropyranyl group, 2-oxo-4-methyl-4-tetrahydropyranyl group, 4-methoxytetrahydrothiopyranyl group, 3-tetrahydrothiophene-1,1-dioxide group, and the like can be given.

When $R_5$ and $R_{10}$ together with the carbon atoms to which they are bound form a $C_{5-15}$ mono- or polycycloalkyl group which is unsubstituted or substituted, examples of such mono- or polycycloalkyl groups include maleic anhydride and norbornene.

Crosslinking agents are those agents which are capable of forming a crosslinked structure under the action of an acid. Some examples of crosslinking agents include aminoplasts such as, for example, glycoluril-formaldehyde resins, melamine-formaldehyde resins, benzoguanamine-formaldehyde resins, and urea-formaldehyde resins. The use of methylated and/or butylated forms of these resins is highly preferred for obtaining long storage life (3-12 months) in catalyzed form. Highly methylated melamine-formaldehyde resins having degrees of polymerization less than two are useful. Monomeric, methylated glycoluril-formaldehyde resins are useful for preparing thermosetting polyester anti-reflective coatings which can be used in conjunction with acid-sensitive photoresists. One example is N,N,N,N-tetra(alkoxymethyl) glycoluril. Examples of N,N,N,N-tetra(alkoxymethyl)glycoluril, may include, e.g., N,N,N,N-tetra(methoxymethyl) glycoluril, N,N,N,N-tetra(ethoxymethyl)glycoluril, N,N,N, N-tetra(n-propoxymethyl)glycoluril, N,N,N,N-tetra(i-propoxymethyl)glycoluril, N,N,N,N-tetra(n-butoxymethyl) glycoluril and N,N,N,N-tetra(t-butoxymethyl)glycoluril. N,N,N,N-tetra(methoxymethyl)glycoluril is available under the trademark POWDERLINK from Cytec Industries (e.g., POWDERLINK 1174). Other examples include methylpropyltetramethoxymethyl glycoluril, and methylphenyltetramethoxymethyl glycoluril. Similar materials are also available under the NIKALAC tradename from Sanwa Chemical (Japan).

Other aminoplast crosslinking agents are commercially available from Cytec Industries under the trademark CYMEL and from Monsanto Chemical Co. under the trademark RESIMENE. Condensation products of other amines and amides can also be employed, for example, aldehyde condensates of triazines, diazines, diazoles, guanidines, guanimines and alkyl- and aryl-substituted derivatives of such compounds, including alkyl- and aryl-Substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino, 1,3,5-triazine, 3,5-diaminotriazole, triaminopyrimidine, 2-mercapto-4,6-diamino-pyrimidine, 3,4,6-tris (ethylamino)-1,3,5-triazine, tris(alkoxycarbonylamino) triazine, N,N,N',N'-tetramethoxymethylurea, methylolbenzoguanamine or alkyl ether compound thereof, such as tetramethylolbenzoguanamine, tetramethoxymethylbenzoguanamine and trimethoxymethylbenzoguanamine; 2,6-bis(hydroxymethyl)4-methylphenol or alkyl ether compound thereof; 4-tert-butyl-2,6-bis(hydroxymethyl)phenol or alkyl ether compound thereof; 5-ethyl-1,3-bis(hydroxymethyl)perhydro-1,3,5-triazin-2-one (common name: N-ethyldimethyloltriazine) or alkyl ether compound thereof; N,N-dimethyloltrimethyleneurea or dialkyl ether compound thereof; 3,5-bis(hydroxymethyl)perhydro-1,3,5-oxadiazin-4-one (common name: dimethylolurone) or alkyl ether compound thereof; and tetramethylolglyoxazaldiurein or dialkyl ether compound thereof and the like, methylolmelamines, such as hexamethylolmelamine, pentamethylolmelamine, and tetramethylolmelamine as well as etherified amino resins, for example alkoxylated melamine resins (for example, hexamethoxymethylmelamine, pentamethoxymethylmelamine, hexaethoxymethylmelamine, hexabutoxymethylmelamine and tetramethoxymethylmelamine) or methylated/butylated glycolurils, for example as well as those found in Canadian Patent No. 1 204 547 to Ciba Specialty Chemicals. Other examples include, for example, N,N,N,N-tetrahydroxymethylglycoluril, 2,6-dihydroxymethylphenol, 2,2',6,6'-tetrahydroxymethyl-bisphenol A, 1,4-bis[2-(2-hydroxypropyl)]benzene, and the like, etc. Other examples of crosslinking agents include those described in U.S. Pat. No. 4,581,321, U.S. Pat. No. 4,889,789, and DE-A 36 34 371, the contents of which are incorporated by reference. Various melamine and urea resins are commercially available under the Nikalacs (Sanwa Chemical Co.), Plastopal (BASF AG), or Maprenal (Clariant GmbH) tradenames.

Cross-linking catalysts include, for example, acid generators, acids, and mixtures thereof. One example of an acid generator is a thermal acid generator. A thermal acid generator is a compound which is not an acid but which is converted to an acid upon heating of the photoresist film. Suitable thermal acid generators useful in the present invention include the ammonium salts of acids where the corresponding amine is volatile. Ammonium salts of acids are prepared by neutralizing an acid with ammonia or an amine. The amine may be a primary, secondary or tertiary amine. The amine must be volatile since it must evaporate from the anti-reflective film upon heating to the temperature required to crosslink the film. When the amine or ammonia evaporates from the anti-reflective film upon heating it leaves an acid in the film. This acid is then present in the anti-reflective film and is employed to catalyze the acid hardening crosslinking reaction upon heating, unless it becomes neutralized by a corresponding amount of a base. Photoacid generators may also be present in the composition and their use and types are well known in the art.

Examples of acid generators include onium salts, benzoin tosylate, nitrobenzyl tosylates, such as 2-nitrobenzyl tosylate, 2,4-dinitrobenzyl tosylate, 2,6-dinitrobenzyl tosylate, 4-nitrobenzyl tosylate; nitrobenzyl benzenesulfonates such as 2-trifluoromethyl-6-nitrobenzyl 4-chlorobenzenesulfonate, as 2-trifluoromethyl-6-nitrobenzyl 4-nitro benzenesulfonate; phenolic sulfonate esters such as phenyl-4-methoxybenzenesulfonate, tris(2,3-dibromopropyl)-1,3,5-triazine-2,4,6-trione, 2,4,4,6-tetrabromocyclohexadienone, the alkyl esters of organic sulfonic acids, p-toluenesulfonic acid, dodecylbenzenesulfonic acid, oxalic acid, phthalic acid, phosphoric acid, camphorsulfonic acid, alkyl and aryl sulfonic acid esters, aromatic sulfonamides, alkyl and aryl phosphoric acid esters, their salts, and mixtures thereof. When benzoin tosylate is heated toluene sulfonic acid is produced by a substitution reaction. Alkyl sulfonates which produce the sulfonic acid by elimination upon heating are examples of other thermal acid generators.

Examples of acids which can be used include the non-salts of the above acid generators and include, for example, organic acids such as sulfonic acids (for example, alkyl and aryl sulfonic acids such as phenylsulfonic acid and para-toluene-sulfonic acid), and alkyl and aryl phosphoric acids. One or more cross-linking catalysts can be used in the composition.

Suitable solvents for use with the inventive composition may include for example ketones such as acetone, methyl ethyl ketone, methyl isobutyl ketone, cyclohexanone, isophorone, methyl isoamyl ketone, 2-heptanone 4-hydroxy, and 4-methyl 2-pentanone; $C_1$ to $C_{10}$ aliphatic alcohols such as methanol, ethanol, and propanol; aromatic group containing-alcohols such as benzyl alcohol; cyclic carbonates such as ethylene carbonate and propylene carbonate; aliphatic or aromatic hydrocarbons (for example, hexane, toluene, xylene, etc and the like); cyclic ethers, such as dioxane and tetrahydrofuran; ethylene glycol; propylene glycol; hexylene glycol; ethylene glycol monoalkylethers such as ethylene glycol monomethylether, ethylene glycol monoethylether; ethylene glycol alkylether acetates such as methylcellosolve acetate and ethylcellosolve acetate; ethylene glycol dialkylethers such as ethylene glycol dimethylether, ethylene glycol diethylether, ethylene glycol methylethylether, diethylene glycol monoalkylethers such as diethylene glycol monomethylether, diethylene glycol monoethylether, and diethylene glycol dimethylether; propylene glycol monoalkylethers such as propylene glycol methylether, propylene glycol ethylether, propylene glycol propylether, and propylene glycol butylether; propylene glycol alkyletheracetates such as propylene glycol methylether acetate, propylene glycol ethylether acetate, propylene glycol propylether acetate, and propylene glycol butylether acetate; propylene glycol alkyletherpropionates such as propylene glycol methyletherpropionate, propylene glycol ethyletherpropionate, propylene glycol propyletherpropionate, and propylene glycol butyletherpropionate; 2-methoxyethyl ether (diglyme); solvents that have both ether and hydroxy moieties such as methoxy butanol, ethoxy butanol, methoxy propanol, and ethoxy propanol; esters such as methyl acetate, ethyl acetate, propyl acetate, and butyl acetate methyl-pyruvate, ethyl pyruvate; ethyl 2-hydroxy propionate, methyl 2-hydroxy 2-methyl propionate, ethyl 2-hydroxy 2-methyl propionate, methyl hydroxy acetate, ethyl hydroxy acetate, butyl hydroxy acetate, methyl lactate, ethyl lactate, propyl lactate, butyl lactate, methyl 3-hydroxy propionate, ethyl 3-hydroxy propionate, propyl 3-hydroxy propionate, butyl 3-hydroxy propionate, methyl 2-hydroxy 3-methyl butanoic acid, methyl methoxy acetate, ethyl methoxy acetate, propyl methoxy acetate, butyl methoxy acetate, methyl ethoxy acetate, ethyl ethoxy acetate, propyl ethoxy acetate, butyl ethoxy acetate, methyl propoxy acetate, ethyl propoxy acetate, propyl propoxy acetate, butyl propoxy acetate, methyl butoxy acetate, ethyl butoxy acetate, propyl butoxy acetate, butyl butoxy acetate, methyl 2-methoxy propionate, ethyl 2-methoxy propionate, propyl 2-methoxy propionate, butyl 2-methoxy propionate, methyl 2-ethoxypropionate, ethyl 2-ethoxypropionate, propyl 2-ethoxypropionate, butyl 2-ethoxypropionate, methyl 2-butoxypropionate, ethyl 2-butoxypropionate, propyl 2-butoxypropionate, butyl 2-butoxypropionate, methyl 3-methoxypropionate, ethyl 3-methoxypropionate, propyl 3-methoxypropionate, butyl 3-methoxypropionate, methyl 3-ethoxypropionate, ethyl 3-ethoxypropionate, propyl 3-ethoxypropionate, butyl 3-ethoxypropionate, methyl 3-propoxypropionate, ethyl 3-propoxypropionate, propyl 3-propoxypropionate, butyl 3-propoxypropionate, methyl 3-butoxypropionate, ethyl 3-butoxypropionate, propyl 3-butoxypropionate, and butyl 3-butoxypropionate; oxyisobutyric acid esters, for example, methyl-2-hydroxyisobutyrate, methyl α-methoxyisobutyrate, ethyl methoxyisobutyrate, methyl α-ethoxyisobutyrate, ethyl α-ethoxyisobutyrate, methyl β-methoxyisobutyrate, ethyl β-methoxyisobutyrate, methyl β-ethoxyisobutyrate, ethyl β-ethoxyisobutyrate, methyl β-isopropoxyisobutyrate, ethyl β-isopropoxyisobutyrate, isopropyl β-isopropoxyisobutyrate, butyl β-isopropoxyisobutyrate, methyl β-butoxyisobutyrate, ethyl β-butoxyisobutyrate, butyl β-butoxyisobutyrate, methyl α-hydroxyisobutyrate, ethyl α-hydroxyisobutyrate, isopropyl α-hydroxyisobutyrate, and butyl α-hydroxyisobutyrate; solvents that have both ether and hydroxy moieties such as methoxy butanol, ethoxy butanol, methoxy propanol, and ethoxy propanol; and other solvents such as dibasic esters, and gamma-butyrolactone; a ketone ether derivative such as diacetone alcohol methyl ether; a ketone alcohol derivative such as acetol or diacetone alcohol; lactones such as butyrolactone; an amide derivative such as dimethylacetamide or dimethylformamide, anisole, and mixtures thereof. The solvent is typically present in an amount of from about 40 to about 95 weight percent.

Since the composition is coated on top of the substrate and is further subjected to dry etching, it is envisioned that the composition is of sufficiently low metal ion level and purity that the properties of the semiconductor device are not adversely affected. Treatments such as passing a solution of the polymer, or compositions containing such polymers, through an ion exchange column, filtration, and extraction processes can be used to reduce the concentration of metal ions and to reduce particles.

The coating composition can be coated on the substrate using techniques well known to those skilled in the art, such as dipping, spincoating or spraying. The film thickness of the anti-reflective coating ranges from about 0.01 μm to about 1 μm. The coating can be heated on a hot plate or convection oven or other well known heating methods to remove any residual solvent and induce crosslinking if desired, and insolubilizing the anti-reflective coatings to prevent intermixing between the anti-reflective coating and the photoresist. The absorption parameter (k) of the present invention composition at either 248 nm or 193 nm typically range from about 0.3 to about 0.9 as measured using ellipsometry. The value of the refractive index (n) typically ranges from about 1.25 to about 1.9. The exact values of the optimum ranges for k and n are dependent on the exposure wavelength used and the type of application.

The antireflective layer is typically cured before a photoresist composition is applied over the antireflective composition. Cure conditions will vary with the components of the antireflective composition. Thus, if the composition does not contain an acid or thermal acid generator, cure temperatures and conditions will be more vigorous than those of a composition containing an acid or acid generator compound. Typical cure conditions are from about 120° C. to 225° C. for about 0.5 to 40 minutes. Cure conditions preferably render the antireflective composition coating layer substantially insoluble to the photoresist solvent as well as an alkaline aqueous developer solution.

After such curing, a photoresist is applied over the surface of the antireflective composition. As with application of the antireflective composition, the photoresist can be applied by any standard means such as by spinning, dipping, meniscus or roller coating. Following application, the photoresist coating layer is typically dried by heating to remove solvent preferably until the resist layer is tack free. Optimally, essentially no intermixing of the antireflective composition layer and photoresist layer should occur.

The resist layer is then imaged with activating radiation through a mask in conventional manner. The exposure energy is sufficient to effectively activate the photoactive component of the resist system to produce a patterned image in the resist coating layer as well as activate the photoacid generator of at least a portion of the thickness of antireflective composition layer so that photogenerated acid from the PAG of the antireflective composition is present at the antireflective composition/resist coating layers interface. Typically, the exposure energy typically ranges from about 3 to 300 mJ/cm$^2$ and depending in part upon the exposure tool and the particular resist and resist processing that is employed. Generally, exposure doses used for typical imaging of a resist layer will be sufficient to photoactivate an effective of acid in the underlying antireflective composition layer.

The exposed resist layer may be subjected to a post-exposure bake if desired to create or enhance solubility differences between exposed and unexposed regions of a coating layer. For example, negative acid-hardening photoresists typically require post-exposure heating to induce the acid-promoted crosslinking reaction, and many chemically amplified positive-acting resists require post-exposure heating to induce an acid-promoted deprotection reaction. Typically post-exposure bake conditions include temperatures of about 50° C. or greater, more specifically a temperature in the range of from about 50° C. to 160° C.

The exposed resist coating layer is then developed, preferably with an aqueous based developer such as an inorganic alkali exemplified by tetrabutyl ammonium hydroxide, sodium hydroxide, potassium hydroxide, sodium carbonate, sodium bicarbonate, sodium silicate, sodium metasilicate, aqueous ammonia or the like. Alternatively, organic developers can be used. In general, development is in accordance with art recognized procedures. Following development, a final bake of an acid-hardening photoresist is often employed at temperatures of from about 100 to 150° C. for several minutes to further cure the developed exposed coating layer areas.

It is typical to etch the antireflective coating through the openings formed in the resist in order to transfer the photoresist pattern to the to the underlying substrate. The etching of the antireflective coating is most often a dry etch.

Processes for the dry etching of antireflective coatings usually are accomplished in a plasma etch system. Antireflective coating etching plasma source gases vary considerably in composition. Some examples of plasma source gas combinations include $CHF_3/CF_4/Ar—O_2$; $CF_4/He—O_2$; $O_2/N_2$; $HBr/O_2$; and $HBr/CO_2/O_2$—Ar.

In one process for etching organic antireflective coatings overlying a silicon-containing substrate, the substrate is placed into a process chamber and treated with a plasma. The plasma is generated from a process gas comprising oxygen and a compound selected from a group of compounds consisting of hydrogen and bromine-containing compounds, hydrogen and iodine-containing compounds, and mixtures thereof. Processing variables are adjusted to provide anisotropic etching of the organic antireflective coating.

In another etching process, an anti-reflection coating overlying a semiconductor substrate is etched by employing a plasma formed from a mixture of oxygen, nitrogen, and at least one inert gas. In an alternative method, the antireflective coating layer may be etched by employing a nitrogen plasma, which includes an inert gas, without any oxygen in the plasma, although the etch rate is said to be reduced.

Another method for plasma etching a antireflective coating layer overlying a semiconductor substrate utilizes etch chemistry provided by a plasma processing gas which includes hydrogen bromide (HBr), $CO_2$, and $O_2$, with argon or another inert gas.

Another method for plasma etching a antireflective coating layer overlying a semiconductor substrate utilizes etch equipment which are reactive ion etching or inductive coupled-plasma etching (ICP) where ICP offers a high-density plasma.

Another method for plasma etching a antireflective coating layer overlying a semiconductor substrate utilizes etch chemistry which create redeposited polymer or deposition of polymers from the gas by a plasma processing gas which includes hydrogen bromide and $C_2F_4$ or higher fluoro analogs. Such techniques assist the anisotropy etch characteristics which is necessary for deep etching and are often referred to as side wall passivation.

EXAMPLES

Example 1

Synthesis of poly((t-boc 3-butene-1-ol-co-allyl benzene)-alt-sulfone)

2.3 g of 3-buten-1-ol, 7.75 g of di-tert-butyl dicarbonate and 10 mL of methylene chloride were placed into a 50 mL round bottom flask and mixed. After cooling the flask to −10° C., 10 mL of 5% aqueous NaOH were added. The mixture was allowed to warm, then heated to 40° C. for 30 min. The reaction was transferred to a separatory funnel and washed with 2×50 mL brine followed by 2×50 mL distilled water. The organic phase was evaporated in a hood and the remaining oil was taken up in acetone and filtered through a silica gel plug (20 g of Silica gel). After removing acetone, the clear transparent product t-BOC protected 3-butene-1-ol weighed 1.17 grams.

2.6 grams of allyl benzene and 1.17 grams of t-BOC protected 3-butene-1-ol of were placed into a two-neck 50 mL round bottom flask equipped with a magnetic stirrer, septum and a dry-ice condenser. Nitrogen flowed through the system from an inlet on the condenser while the condenser and reaction flask were cooled to −76° C. with a combination of dry ice and acetone. 10 mL of $SO_2$ was collected by condensing $SO_2$ gas introduced through the condenser inlet. $SO_2$, allyl benzene, and t-BOC protected 3-butene-1-ol were mixed and 0.23 g of tertbutylperoxide was added via syringe thought the septum. After 20 minutes, the mixture solidified. The reaction was allowed to warm to room temperature which removes the residual $SO_2$. The solid was broken up with 10 mL of methanol and poured into 50 mL of methanol. The white solid collected after filtration and drying in a vacuum desicator weight 5.3 grams (94.4%).

Example 2

The polymer from Example 1 was formulated into an antireflective coating composition (by weight—5% of the polymer from Example 1; tetrakis (methoxymethyl)glycoluril (at ⅓ the weight of the polymer from Example 1); dodecylbenzenesulfonate triethylamine (at 1% weight of the polymer from Example 1); balance ethyl lactate. This formulation was filtered through a 0.2 μm filter. The optical indices of a spin-casted film from this antireflective coating composition were measured using VUV-VASE and found to be at 193 nm n=1.83, k=0.70.

The antireflective coating composition of the present invention (Example 2) was compared to two commercially available antireflective coating compositions and a photoresist to evaluate the etch rate as a function of etch plate temperature.

The commercial antireflective coating compositions and photoresist were used as is.

Samples of the antireflective coating compositions and photoresists were each spin coated onto a silicon wafer at 3000 rpm and baked at 180° C. for 60 seconds. The film thickness on each wafer, prior to etching, was about 2890 Å.

The coated wafers were etched under the following conditions:

Instrument—NE-5000N (ULVAC); RF power; 500 W (ISM)/100 W (bias); gas flow—$CF_4/Ar/O_2$ (50/150/20 sccm); pressure—5 Pa; etching time—10 seconds. Etch plate temperature ranged from 0° C. to 40° C.

Over the tested temperature range, the two commercial antireflective coating compositions did not show much change in the etch rate as the etch plate temperature increased. The photoresist showed a rate of etch rate to etch plate temperature of about 10 Å·min$^{-1}$/° C. The antireflective coating composition of the present invention (Example 2) showed a rate of etch rate to etch plate temperature of at least 30 Å·min$^{-1}$/° C.

Example 3

Synthesis of Poly(phthalaldehyde-co-propionaldehyde)

5 g of ortho-phthalaldehyde, 2.5 g of propionaldehyde and 17 mL of methylene chloride were placed into a 50 mL round bottom flask and mixed by stirring. The flask was cooled to −77° C. using a dry ice acetone bath and a solution consisting of 2 mL of 1M $BF_3$ etherate and 7 mL methylene chloride was added. The mixture was kept at −77° C. for 18 h upon which the solution solidified and stopped the magnetic stirrer. A mixture of 2 mL of pyridine in 10 mL of methylene chloride was cooled to −77° C. and then added to the above mixture with mixing. While cold, the mixture was poured into 100 mL of methanol and the solid was filtered and dried to afford 5.16 g of solid white polymer. $H^1$-NMR revealed approximately 3:1 phthalaldehyde:propionaldehyde incorporation into the resin. A 5% by weight solution of poly(phthalaldehyde-co-propionaldehyde) in PGMEA was made. A sample of the solution was spin-coated onto a silicon wafer at 3000 rpm and baked at 180° C. for 60 seconds. The film thickness was 72 nm. The optical indices of the spin casted film were measured using VUV-VASE and found to be at 193 nm n=1.76, k=0.89.

Example 4

Synthesis of poly((t-butyl 5-norbornene-2-carboxylate-co-allyl benzene)-alt-sulfone)

5 grams of allyl benzene and 7 g of t-butyl 5-norbornene-2-carboxylate were placed into a two-neck 50 mL round bottom flask equipped with a magnetic stirrer, septum and a dry-ice condenser. Nitrogen was introduced into the flask from an inlet on the condenser while the condenser and reaction flask were cooled to −85° C. with a combination of liquid nitrogen and acetone. 10 mL of $SO_2$ was collected by condensing $SO_2$ gas introduced through the condenser inlet. The $SO_2$, the allyl benzene and the t-butyl-5-norborne-2-carboxylate were mixed and a 0.2 mL of 6M tert-butyl hydroperoxide solution in decane was added via syringe thought the septum. After 20 minutes, the mixture solidified. The reaction was allowed to warm to room temperature and the residual $SO_2$ was removed. The solid was broken up with 10 mL of methanol and poured into 50 mL of methanol. The white solid collected after filtration and drying in a vacuum desiccator weight 14.5 grams (82.2%).

Example 5

The polymer from Example 4 was formulated into an antireflective coating composition (by weight—5% of the polymer from Example 4; tetrakis (methoxymethyl)glycoluril (at ⅓ the weight of the polymer from Example 4); dodecylbenzenesulfonate triethylamine (at 1% weight of the polymer from Example 4); balance ethyl lactate. This formulation was filtered through a 0.2 μm filter. The optical indices of the spin casted film from this antireflective coating composition were measured using VUV-VASE and found to be at 193 nm n=1.74, k=0.48.

Example 6

Synthesis of poly((t-boc 3-butene-1-co-allyl benzene-co-1-hexene)-alt-sulfone)

2.91 grams of allyl benzene and 2.22 g of 1-hexene and 2.52 g of t-boc 3-butene-1 were placed into a two-neck 50 mL round bottom flask equipped with a magnetic stirrer, septum and a dry-ice condenser. Nitrogen was introduced into the flask from an inlet on the condenser while the condenser and reaction flask were cooled to −80° C. with a combination of liquid nitrogen and acetone. 10 mL of $SO_2$ was collected by condensing $SO_2$ gas introduced through the condenser inlet. The $SO_2$, allyl benzene, 1-hexene, and t-boc 3-butene-1 were mixed and 0.3 mL of a 6M tert-butyl hydroperoxide solution in decane was added via syringe thought the septum. After 20 minutes, the mixture solidified. The reaction was allowed to warm to room temperature and the residual $SO_2$ was removed. The solid was broken up with 10 mL of methanol and poured into 50 mL of methanol. The white solid collected after filtration and drying in a vacuum desiccator weight 10.6 grams (89.5%).

Example 7

The polymer from Example 6 was formulated into an antireflective coating composition (by weight—5% of the polymer from Example 6; tetrakis (methoxymethyl)glycoluril (at ⅓ the weight of the polymer from Example 6); dodecylbenzenesulfonate triethylamine (at 1% weight of the polymer from Example 6); balance PGME. This formulation was filtered through a 0.2 μm filter.

The foregoing description of the invention illustrates and describes the present invention. Additionally, the disclosure shows and describes only certain embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The invention claimed is:
1. A composition comprising a) a polymer having a ceiling temperature in the range from about 0° C. to about 70° C.; b) a crosslinker; and c) optionally, a cross-linking catalyst, further where the polymer is selected from,

(i) a polymer comprising repeating units

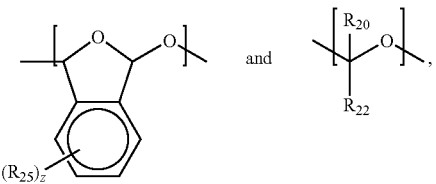

or
(ii) a polymer comprising repeating units

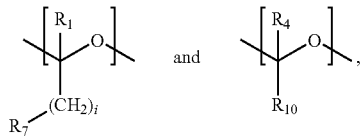

where $R_1$, $R_4$, and $R_{20}$ are each independently selected from hydrogen, halogen, unsubstituted $C_{1-4}$ alkyl and substituted $C_{1-4}$ alkyl; $R_7$ is a chromophore which absorbs at any actinic wavelength; $R_{10}$ is $-(CH_2)_j-OR_8$ and $R_8$ is selected from hydrogen, an acid labile group, and a crosslinking site; $R_{22}$ is selected from unsubstituted $C_{1-4}$ alkyl, substituted $C_{1-4}$ alkyl, unsubstituted alkoxycarbonyl, substituted alkoxycarbonyl, and crosslinking site; $R_{25}$ is selected from unsubstituted $C_{1-4}$ alkyl, substituted $C_{1-4}$ alkyl, $C_{1-4}$ unsubstituted alkoxy, $C_{1-4}$ substituted alkoxy, halogen, cyano, and nitro; i is 0 or 1; j is 0, 1, or 2; and z is 1 to 4.

2. The composition of claim 1 wherein the polymer comprises repeating units

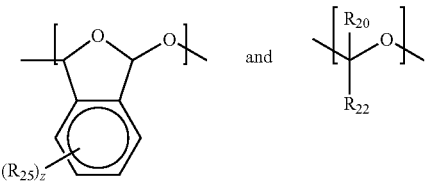

where $R_{20}$ is selected from hydrogen, halogen, unsubstituted $C_{1-4}$ alkyl and substituted $C_{1-4}$ alkyl; $R_{22}$ is selected from unsubstituted $C_{1-4}$ alkyl, substituted $C_{1-4}$ alkyl, unsubstituted alkoxycarbonyl, substituted alkoxycarbonyl, and crosslinking site; $R_{25}$ is selected from unsubstituted $C_{1-4}$ alkyl, substituted $C_{1-4}$ alkyl, $C_{1-4}$ unsubstituted alkoxy, $C_{1-4}$ substituted alkoxy, halogen, cyano, and nitro; and z is 1 to 4.

3. The composition of claim 1 wherein the polymer comprises repeating units

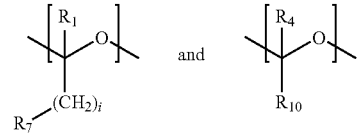

where $R_1$ and $R_4$ are each independently selected from hydrogen, halogen, unsubstituted $C_{1-4}$ alkyl and substituted $C_{1-4}$ alkyl; $R_7$ is a chromophore which absorbs at any actinic wavelength; $R_{10}$ is —$(CH_2)_i$—$OR_8$ and $R_8$ is selected from hydrogen, an acid labile group, and a crosslinking site; and i is 0 or 1.

4. The composition of claim 1 wherein $R_7$ is selected from the group of unsubstituted fluorine, substituted fluorene, vinylenephenylene, anthracene, perylene, phenyl, benzyl, chalcone, phthalimide, pamoic acid, acridine, azo compounds, dibenzofuran, thiophenes, anthracene, naphthalene, benzene, chalcone, phthalimides, pamoic acid, acridine, azo compounds, chrysenes, pyrenes, fluoranthrenes, anthrones, benzophenones, thioxanthones, heterocyclic aromatic rings containing heteroatoms selected from oxygen, nitrogen, sulfur, and combinations thereof.

5. The composition of claim 1 wherein $R_7$ is unsubstituted or substituted phenyl.

6. The composition of claim 1 wherein for a), the polymer has a ceiling temperature in the range of from about 20° C. to about 65° C.

7. The composition of claim 2 wherein for a), the polymer is selected from

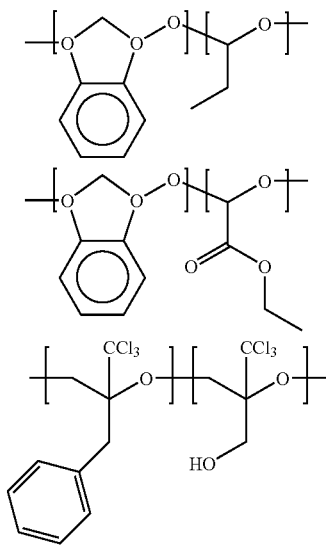

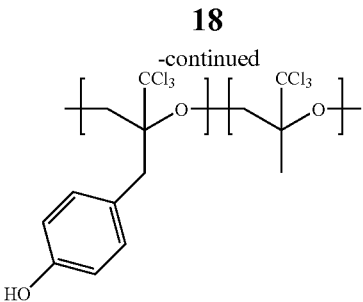

and

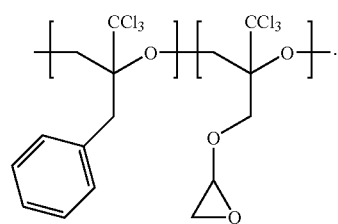

8. A method for forming a photoresist relief image comprising: applying on a substrate a layer the composition of claim 1; applying a layer of chemically-amplified photoresist composition above said composition of claim 1.

9. The method of claim 8 wherein the photoresist composition is imaged with activating radiation and the imaged photoresist composition is treated with a developer to provide a photoresist relief image.

10. A coated substrate comprising: a substrate having thereon; a layer of the composition of claim 1; a layer of a chemically-amplified photoresist composition above said composition of claim 1.

\* \* \* \* \*